(12) United States Patent
Robinson-Grayson et al.

(10) Patent No.: US 11,386,514 B2
(45) Date of Patent: Jul. 12, 2022

(54) DEVICE, SYSTEM AND METHOD FOR ELECTRONICALLY REQUESTING AND STORING MISSING DIGITAL EVIDENTIARY ITEMS

(71) Applicant: MOTOROLA SOLUTIONS, INC., Chicago, IL (US)

(72) Inventors: Clarissa Robinson-Grayson, Rockwall, TX (US); Chun Wang, Chicago, IL (US); Gelayol Moradzadeh, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 203 days.

(21) Appl. No.: 16/878,853

(22) Filed: May 20, 2020

(65) Prior Publication Data

US 2021/0366069 A1 Nov. 25, 2021

(51) Int. Cl.
*G06Q 10/00* (2012.01)
*G06Q 50/26* (2012.01)
*G06Q 10/10* (2012.01)

(52) U.S. Cl.
CPC .......... *G06Q 50/265* (2013.01); *G06Q 10/10* (2013.01)

(58) Field of Classification Search
CPC ............................ G06Q 50/265; G06Q 10/10
See application file for complete search history.

(56) References Cited

U.S. PATENT DOCUMENTS

| 6,405,213 B1 | 6/2002 | Layson et al. |
| 7,181,493 B2 | 2/2007 | English et al. |
| 8,998,083 B2 | 4/2015 | McIntyre |

(Continued)

FOREIGN PATENT DOCUMENTS

| AU | 2014200156 A1 * | 7/2014 |
| AU | 2013201326 A1 * | 9/2014 |

(Continued)

OTHER PUBLICATIONS https://www.americanbar.org/groups/criminal_justice/standards/law_enforcement_access/ (Year: 2013).*

*Primary Examiner* — Gabrielle A McCormick
(74) *Attorney, Agent, or Firm* — Perry + Currier, Inc.

(57) ABSTRACT

A device, system and method for electronically requesting and storing missing digital evidentiary items is provided. A dashboard computing device: receives, from distinct jurisdictional agency computing devices, indications of jurisdictional digital evidentiary items associated with an incident; determines, based on an incident type of the incident, one or more offenses associated with the incident type; determines required digital evidentiary items to prosecute the offenses via a digital offenses-to-evidentiary-items mapping; identifies a missing digital evidentiary item for prosecuting the offenses by: comparing the indications of the jurisdictional digital evidentiary items with the required digital evidentiary items; identifies a jurisdictional agency, associated with one or more of the distinct jurisdictional agency computing devices, that is most likely to have access to the missing digital evidentiary item; and renders, at a display screen, an actuatable option for electronically requesting the missing digital evidentiary item from the jurisdictional agency.

18 Claims, 9 Drawing Sheets

(56) References Cited

U.S. PATENT DOCUMENTS

| | | | |
|---|---|---|---|
| 9,235,870 B2 | 1/2016 | Kottoor et al. | |
| 9,619,851 B1* | 4/2017 | McIntyre | G06Q 10/10 |
| 10,832,261 B1* | 11/2020 | Chan | G06Q 40/025 |
| 2002/0113707 A1* | 8/2002 | Grunes | G06K 1/18 |
| | | | 340/572.1 |
| 2004/0192329 A1* | 9/2004 | Barbosa | H04L 69/329 |
| | | | 455/457 |
| 2006/0269104 A1 | 11/2006 | Clolli | |
| 2009/0100030 A1* | 4/2009 | Isakson | G06F 16/436 |
| 2009/0210245 A1* | 8/2009 | Wold | G06Q 30/02 |
| | | | 707/999.005 |
| 2010/0265068 A1* | 10/2010 | Brackmann | B60P 3/14 |
| | | | 340/572.1 |
| 2011/0058034 A1* | 3/2011 | Grass | G08B 13/19656 |
| | | | 348/143 |
| 2012/0318866 A1* | 12/2012 | McIntyre | G06Q 50/18 |
| | | | 235/385 |
| 2013/0254133 A1* | 9/2013 | Connell | G06Q 10/00 |
| | | | 705/342 |
| 2014/0156657 A1* | 6/2014 | Kottoor | G06Q 50/26 |
| | | | 707/736 |
| 2015/0096002 A1* | 4/2015 | Shuart | G06F 21/32 |
| | | | 726/7 |
| 2018/0003513 A1* | 1/2018 | Guzik | G01C 21/3407 |
| 2019/0188814 A1* | 6/2019 | Kreitzer | G06F 21/6245 |
| 2019/0236346 A1 | 8/2019 | Barone et al. | |

FOREIGN PATENT DOCUMENTS

| | | | | |
|---|---|---|---|---|
| WO | WO-2013036943 A1 * | 3/2013 | | G06Q 50/26 |
| WO | 2014081711 A1 | 5/2014 | | |
| WO | WO-2018217891 A1 * | 11/2018 | | G06F 16/90332 |

\* cited by examiner

DEVICE, SYSTEM AND METHOD FOR ELECTRONICALLY REQUESTING AND STORING MISSING DIGITAL EVIDENTIARY ITEMS

BACKGROUND

Reviewing digital evidence of public-safety incidents, such as videos and incident reports, can be time consuming and prone to error. Furthermore, missing digital evidence may lead to loss of time in pursuing charges for public-safety incidents and/or may lead to lesser offenses being prosecuted when a greater offense has occurred.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
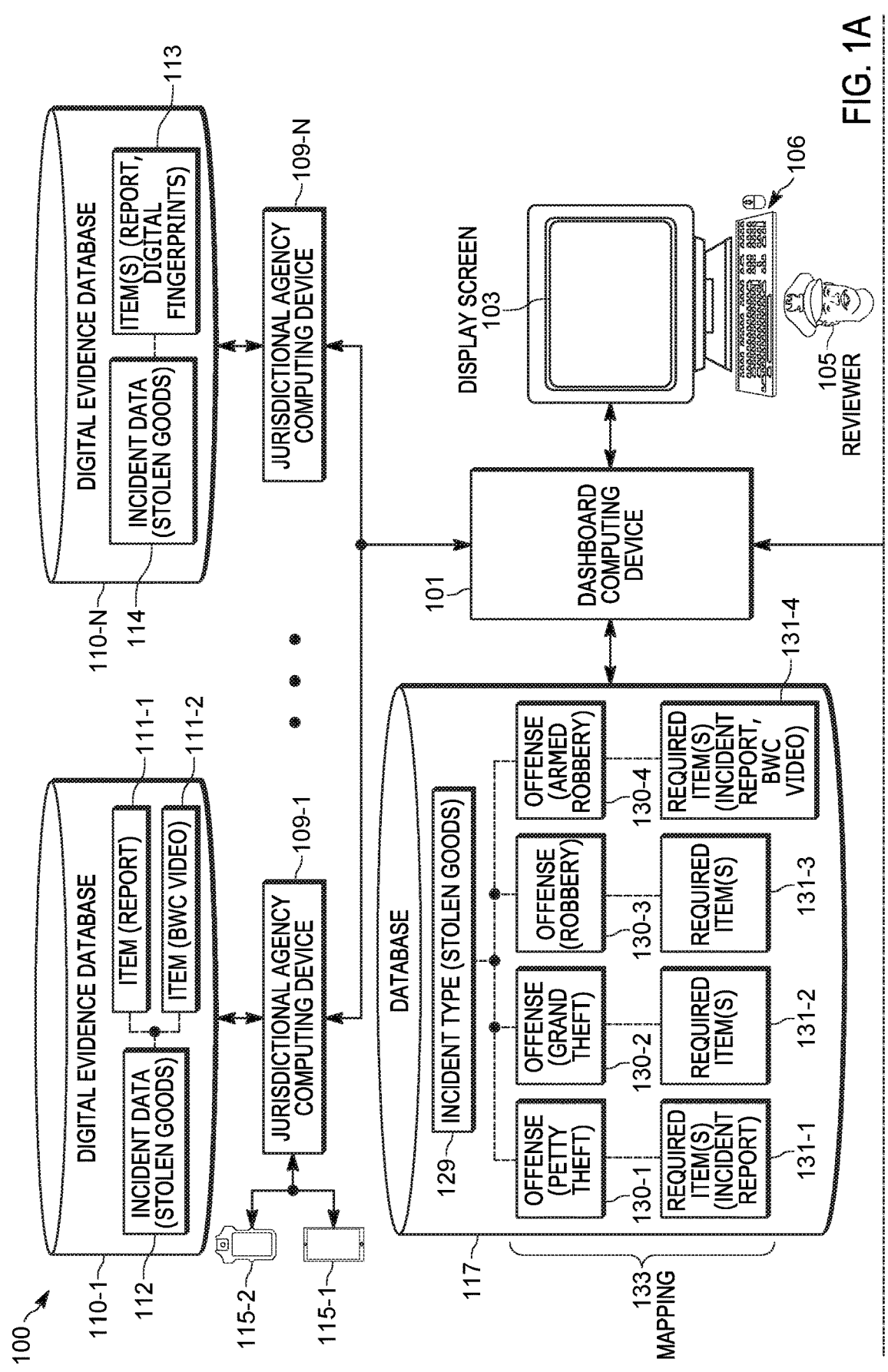
FIG. 1A and FIG. 1B is a system for electronically requesting and storing missing digital evidentiary items, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Reviewing digital evidence of public-safety incidents, such as videos and incident reports, can be time consuming and prone to error. Furthermore, missing digital evidence may lead to loss of time in pursuing charges for public-safety incidents and/or may lead to lesser offenses being prosecuted when a greater offense has occurred. For example, an incident (e.g. a public safety incident) may be of a given type that may be prosecuted according to different offenses depending on the available evidence. In a particular example, in an incident having an incident type of "stolen goods", the incident may be prosecuted as petty theft, grand theft, robbery and/or armed robbery depending on a value of items stolen and/or presence of an offender and/or weapons carried by the offender. However, when evidence, and in particular digital evidence, is missing and/or incomplete, the incident type of the robbery may be misclassified; for example, when there is no digital evidence that an offender carried a gun (and the like), the incident type of stolen goods may be prosecuted as a robbery rather than an armed robbery. The problem may be particularly challenging when digital evidence is stored across various databases operated by different jurisdictional agencies.

An aspect of the present specification provides a method comprising: receiving, at a dashboard computing device, from distinct jurisdictional agency computing devices, indications of jurisdictional digital evidentiary items associated with an incident; determining, by the dashboard computing device, based on an incident type of the incident, one or more offenses associated with the incident type; determining, by the dashboard computing device, required digital evidentiary items to prosecute the one or more offenses via a digital offenses-to-evidentiary-items mapping; identifying, by the dashboard computing device, a missing digital evidentiary item for prosecuting the one or more offenses by: comparing the indications of the jurisdictional digital evidentiary items with the required digital evidentiary items; identifying, by the dashboard computing device, a jurisdictional agency, associated with one or more of the distinct jurisdictional agency computing devices, that is most likely to have access to the missing digital evidentiary item; and rendering, by the dashboard computing device, at a display screen, an actuatable option for electronically requesting the missing digital evidentiary item from the jurisdictional agency.

Another aspect of the present specification provides a dashboard computing device comprising: a communication unit; and a controller in communicatively coupled with a display screen and the communication unit, the controller configured to: receive, via the communication unit, from distinct jurisdictional agency computing devices, indications of jurisdictional digital evidentiary items associated with an incident; determine, based on an incident type of the incident, one or more offenses associated with the incident type; determine required digital evidentiary items to prosecute the one or more offenses via a digital offenses-to-evidentiary-items mapping; identify a missing digital evidentiary item for prosecuting the one or more offenses by: comparing the indications of the jurisdictional digital evidentiary items with the required digital evidentiary items; identify a jurisdictional agency, associated with one or more of the distinct jurisdictional agency computing devices, that is most likely to have access to the missing digital evidentiary item; and render, at the display screen, an actuatable option for electronically requesting the missing digital evidentiary item from the jurisdictional agency.

Figure 1B:
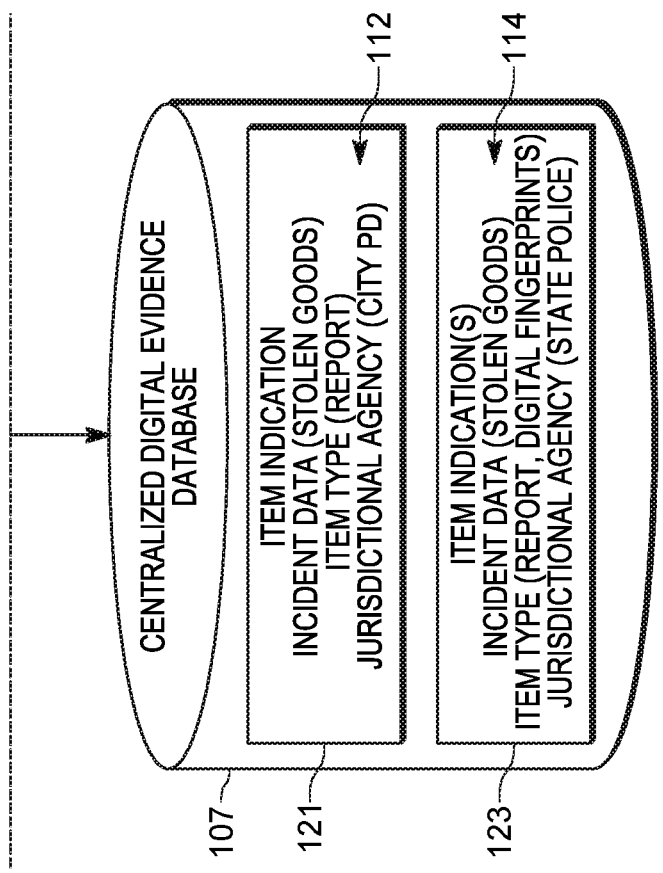

Attention is directed to FIG. 1A and FIG. 1B, which depict an example system 100 for electronically requesting and storing missing digital evidentiary items associated with an incident (e.g. a public-safety incident). The system 100 comprises a dashboard device 101, which may comprise a computing device and/or a public-safety computing device, which generates a dashboard at a display screen 103, for example for reviewing digital evidence. The dashboard device 101, interchangeably referred to hereafter as the device 101, is hence generally configured to communicate with the display screen 103; a reviewer 105 may operate and/or interact with the device 101 via the display screen using at least one input device 106 (e.g. such as a keyboard (as depicted), a pointing device (as depicted a mouse), a microphone, and the like). The device 101 further has access to a memory and/or database 107 (e.g. as depicted a centralized digital evidence database) storing indications of digital evidence, as described in more detail below. Communication links between components of the system 100 are depicted in FIG. 1A AND FIG. 1B, and throughout the present specification, as double-ended arrows between respective components; the communication links may include any suitable combination of wireless and/or wired links and/or wireless and/or wired communication networks.

The dashboard device 101 may comprise one or more cloud servers and/or one or more premises-based servers, and the like, and may be operated and/or managed by a public-safety agency such as a police force and/or a court system and the like. The dashboard device 101 will be described in more detail below with reference to FIG. 2. The dashboard device 101 may generally provide services related to collecting and providing indications of digital evidence in a dashboard for reviewing digital evidence; such services provided by the dashboard device 101 may include, but are not limited to, processing information from the database 107 and/or generating information for storage at the database 107. Examples of a dashboard provided by the dashboard device 101 are described in more detail below, however, such a dashboard may include a graphical user interface (GUI), and the like, showing a timeline of events associated with an incident, for example as represented by digital evidence and/or lists of digital evidence, and the like, for one or more incidents (and in particular public-safety incidents).

The display screen 103 and the at least one input device 106 may generally comprises components of a terminal, and the like, which may be operated by the reviewer 105 to review the indications of digital evidence stored at the database 107, as provided at a dashboard rendered at the display screen 103; in particular, the display screen 103 and the at least one input device 106 of the terminal of may be used by the reviewer 105 to interact with the dashboard device 101 to review the indications of the digital evidence stored at the database 107, and provided at a dashboard, to assist the reviewer 105 in determining an offense with which an offender in an incident may be charged, as described in more detail below.

As depicted, the reviewer 105 may comprise a prosecutor, a first responder and/or public-safety officer, and in particular, a police officer, and/or any other suitable reviewer, and the like, who is reviewing indications of digital evidence stored at the database 107. However, the reviewer 105 may comprise any suitable reviewer of digital evidence including, but not limited to, a records management clerk, an officer of a court, a store manager, a security guard, a lawyer, and the like. Hence the reviewer 105 may or may not be a public-safety officer. Similarly, while present examples are described with respect to public-safety incidents, the methods, devices and systems described herein may be applied to incidents that are not public-safety incidents including, but not limited to, incidents in privately owned spaces such as malls, and the like, incidents related to workplace safety, workplace employment, and the like.

In particular, as depicted, the dashboard device 101 is in communication with a plurality of distinct jurisdictional agency computing devices 109-1, . . . , 109-N, interchangeably referred to hereafter, collectively, as the jurisdictional agency computing devices 109 and, generically, as a jurisdictional agency computing device 109. The number "N" is any suitable integer representing a number of distinct jurisdictional agency computing devices with which the dashboard device 101 is in communication. While only two (e.g. N=2) jurisdictional agency computing devices 109 are depicted, the system 100 may comprise any suitable number of jurisdictional agency computing devices 109.

For example the jurisdictional agency computing devices 109 may comprise computing devices, servers, cloud computing devices, and the like, operated and/or managed by different jurisdictional agencies including, but not limited to, police agencies (such as a city, state or federal police agencies), hospitals and/or medical agencies, fire departments and/or agencies, and the like. Indeed, the term distinct jurisdictional agencies may be understood to mean different agencies and/or public safety agencies (e.g. police, medical, firefighters, and the like) of a jurisdiction (e.g. a city, a county, a municipality, a state, a country, and the like, and/or private agencies such as private security companies, private entities and/or businesses, and the like), and/or different jurisdictions that may respond to and/or investigate incidents and collect evidence for the incidents.

For example, as depicted, each jurisdictional agency computing device 109 is in communication with a respective memory and/or database 110-1 . . . 110-N, interchangeably referred to hereafter, collectively, as the databases 110 and, generically, as a database 110. A database 110 generally stores respective digital evidentiary items associated with an incident. For example, as depicted, the database 110-1 stores jurisdictional digital evidentiary items 111-1, 111-2 associated with a given incident represented by incident data 112; the jurisdictional digital evidentiary items 111-1, 111-2 are interchangeably referred to hereafter, collectively, as the digital evidentiary items 111 (and/or the items 111) and, generically, as a digital evidentiary item 111 (and/or an item 111).

Similarly, the database 110-N stores jurisdictional digital evidentiary items 113 associated with a given incident represented by incident data 114; while details of the two digital evidentiary items 111 are shown, and the digital evidentiary items 113 are depicted more generically, the digital evidentiary items 111, 113 may comprise any suitable number digital evidentiary items of any suitable type including, but not limited to digital videos (e.g. BWC video, security camera video, and the like); digital images; digital audio; digital incident reports (e.g. police, medical, fire, security, workplace, and the like); digital radio logs, digital medical reports; digital fingerprints, and/or any other suitable type of digital evidence.

In particular, as depicted, the digital evidentiary item 111-1 comprises an incident report (e.g. "Report") for an associated incident, and the digital evidentiary item 111-1 comprises video (e.g. body worn camera video (BWC) for the associated incident; in particular the incident data 112 may comprise data indicative of the incident for which the digital evidentiary items 111 were collected. The incident data 112 may comprise an incident type (e.g. "Stolen Goods", and the like), an assigned incident number, an address of an incident, a date, a time, suspects for the incident, and the like. Associations between components stored at memories and/or databases herein are shown using dashed lines; hence, as depicted, the digital evidentiary items 111 are associated with the incident data 112 (and/or an incident defined by the incident data 112). Furthermore, while only two digital evidentiary items 111 are depicted, for one incident (e.g. one set of incident data 112), the database 110-1 may store any suitable number of digital evidentiary items 111 for any suitable number of incidents (e.g. any suitable number of sets of incident data 112). Furthermore, the digital evidentiary item 111 may further comprise a date and/or time at which a digital evidentiary item 111 was acquired and/or generated, an identifier of a person and/or public-safety officer, and the like, operating a device that acquired and/or generated the digital evidentiary item 111, and the like. In yet further examples, the incident data 112 may be optional and/or a portion thereof may be incorporated into a digital evidentiary item 111.

The digital evidentiary items 113 may be similar to, or different from, the digital evidentiary items 111 and be associated with incident data 114 that may be similar to, or different from the incident data 112. For example, as depicted, the digital evidentiary items 113 comprises digital fingerprints and an incident report ("Report") that comprises an incident report of the judicial agency associated with the computing device 109-2 (e.g. and which is different from the incident report of the digital evidentiary item 111-1). As also depicted, the incident data 114 may comprise an incident type (e.g. "Stolen Goods") that is the same (e.g. as depicted) or different from an incident type of the incident data 114. Furthermore, the incident data 112, 114 may be associated with a same incident (e.g. which has been responded to by different jurisdictional agencies) or different incidents.

As depicted, the jurisdictional agency computing device 109-1 may be in communication with any suitable number of digital evidence collection devices 115-1, 115-2, interchangeably referred to hereafter, collectively, as the digital evidence collection devices 115 and, generically, as a digital evidence collection device 115. In particular, as depicted, the digital evidence collection device 115-1 comprises a mobile device (e.g. operated by a police officer) and the digital evidence collection device 115-2 comprises a body-worn camera (e.g. worn by the police officer). Hence, for example, the digital evidentiary item 111-1 (e.g. an incident report) may be generated and/or acquired by the digital evidence collection device 115-1 (e.g. a mobile device implementing an incident report application), and the digital evidentiary item 111-2 (e.g. a BWC video) may be generated and/or acquired by the digital evidence collection device 115-2 (e.g. a body worn camera); the digital evidentiary items 111, and the incident data 112, may be uploaded to the database 110-1 via the jurisdictional agency computing device 109-1 (and/or the jurisdictional agency computing device 109-1 may receive the digital evidentiary items 111, generate the incident data 112, and store the digital evidentiary items 111 in association with the incident data 112 at the database 110-1). Furthermore, while two digital evidence collection devices 115 are depicted, the jurisdictional agency computing device 109-1 may be in communication with any suitable number of digital evidence collection devices 115 of any suitable type. In addition, while the depicted digital evidence collection devices 115 are both mobile devices, in other examples, a digital evidence collection device 115 may not be a mobile device.

While no digital evidence collection devices are depicted as being in communication with the jurisdictional agency computing device 109-N, such a depiction is merely for simplicity and it is understood that the jurisdictional agency computing device 109-N may be in communication with any suitable number of digital evidence collection devices of any suitable type, and that such digital evidence collection devices may collect the digital evidentiary items 113.

As depicted, the database 107 has received respective indications 121, 123 of jurisdictional digital evidentiary items 111-1, 113 (e.g. but not an indication of the jurisdictional digital evidentiary item 111-2) from the jurisdictional agency computing devices 109. For example, the indication 121 comprises any suitable data indicative of the jurisdictional digital evidentiary item 111-1 which may include, but is not limited to, the incident data 112 (e.g. and which, as depicted, may include an incident type), a type of the jurisdictional digital evidentiary item 111-1 (e.g. a "Report"), an identifier (e.g. an alphanumeric identifier, and the like; as depicted "City PD ("Police Department")) of the jurisdictional agency that collected the jurisdictional digital evidentiary item 111-1, and the like. However, in general, the indication 121 of the jurisdictional digital evidentiary item 111-1 may not include the jurisdictional digital evidentiary item 111-1 itself.

Similarly, the indication 123 comprises any suitable data indicative of the jurisdictional digital evidentiary items 113 which may include, but is not limited to, the incident data 114 (e.g. and which, as depicted, may include an incident type), a type of the jurisdictional digital evidentiary items 113 (e.g. a "Report"), an identifier (e.g. an alphanumeric identifier, and the like; as depicted "State Police") of the jurisdictional agency that collected the jurisdictional digital evidentiary items 113, and the like. However, in general, the indication 123 of the jurisdictional digital evidentiary items 113 may not include the jurisdictional digital evidentiary items 113 itself.

However, in other examples, the indications 121, 123 of the jurisdictional digital evidentiary items 111, 113 may include the jurisdictional digital evidentiary items 113 itself, however such examples may lead to increased memory usage at the database 107.

Hence, the database 107 may act as a central repository for digital evidence across different jurisdictions. For example, jurisdictional agencies operating and/or managing the jurisdictional agency computing devices 109 may subscribe to a service offered by an entity (e.g. a private company, a court-based entity, and the like) operating the database 107 and agree to transmit indications of digital evidence stored at the database 110 to the centralized digital evidence database 107. As such, the reviewer 105 may have access to digital evidence across a large number of jurisdictional agencies. For example, the indications 121, 123 may be viewed, by the reviewer 105, via a dashboard provided at the display screen 103, as described herein, and the reviewer 105 may retrieve associated digital evidentiary items 111, 113 from the databases 110 via the indications 121, 123; as such, it is further understood that the indications 121, 123 may further comprise respective links, and the like, to locations of associated digital evidentiary items 111, 113 at the databases 110 for easy retrieval of the digital evidentiary items 111, 113 by the reviewer 105.

While as depicted the database 107 does not store an indication of the jurisdictional digital evidentiary item 111-

2, population of the database 107 with indication of the jurisdictional digital evidentiary item 111-2 is described in more detail below. For example, the jurisdictional digital evidentiary item 111-2 may comprise a missing digital evidentiary item as described in more detail below.

Indeed, the device 101 may further determine whether particular jurisdictional digital evidence is missing from the database 107 and/or use the indications 121, 123 to determine offenses that may be prosecuted using the jurisdictional digital evidentiary items 111, 113.

For example, as depicted, the device 101 is in further communication with a database 117 that stores an incident type 129 (e.g. as depicted "Stolen Goods") in association with data indicative of one or more offenses 130-1, 130-2, 130-3, 130-4 associated with the incident type 129. The data indicative of offenses 130-1, 130-2, 130-3, 130-4 is interchangeably referred to hereafter, collectively, as the offenses 130 and, generically, as an offense 130. Furthermore, while four offenses 130 are listed, the incident type 129 may be associated with fewer than four offenses 130 (e.g. and as few as one offense 130), or more than four offenses 130.

For example, as depicted, the incident type 129 comprises "Stolen Goods" and the associated offenses 130 comprise "Petty Theft", "Grand Theft", "Robbery" and "Armed Robbery". Put another way, when goods are stolen, an offense that is prosecuted as a result of the goods being stolen may depend on a value of goods stolen (e.g. petty theft vs grand theft) and/or presence of an offender stealing the goods by force (e.g. theft when the goods are stolen surreptitiously vs robbery when the goods are stolen in person by force) and/or weapons carried by the offender (e.g. robbery vs armed robbery). Hence, as depicted, the incident type of "Stolen Goods" may be prosecuted according to four different offenses 130, depending on the available evidence.

Hence, as depicted, the offenses 130 are further mapped and/or associated with data indicative of required digital evidentiary items 131-1, 131-2, 131-3, 131-4 required to prosecute an associated offense 130. The data indicative of the digital evidentiary items 131-1, 131-2, 131-3, 131-4 is interchangeably referred to hereafter, collectively, as the required items 131 and, generically, as a required item 131.

In some examples, the association between the offenses 130 and the required digital evidentiary items 131 may be referred to as a digital offenses-to-evidentiary-items mapping 133 (referred to hereafter, interchangeably, as the mapping 133).

An example of such required items 131 is provided in the required items 131-4. For example, to prosecute an offense 130-1 of "petty theft", the required items 131-1 may include only an incident report. In contrast, to prosecute an offense 130-4 of "armed robbery", the required items 131-4 may include an incident report and a BWC video of the incident, for example to prove that an offender carrying a weapon was present at the "armed robbery". While details of the other required items 131-2, 12-4 are not provided, it is understood that the other required items 131 may indicate one or more digital evidentiary items required to prosecute an associated offense 130; for example, a required item for a "grand theft" (e.g. the offense 130-2) may include a summary of value of goods stolen, while a required item for a "robbery" (e.g. the offense 130-3) may include digital fingerprints of an offender that performed the robbery. Indeed the required items 131 may comprise any suitable combination of digital items.

As such, the term "missing digital evidentiary item", as used herein, may be understood to include a digital evidentiary item required to prosecute an associated offense 130 and for which an indication is missing at the database 107 and/or the which may be missing from the databases 110. Hence, in some examples, a digital evidentiary item required to prosecute an associated offense 130 may not be stored at the databases 110, but rather may reside (e.g. be stored) initially only at a device and/or a mobile device that generated and/or acquired the digital evidentiary item.

Hence, in the depicted examples, the jurisdictional digital evidentiary item 111-2 (e.g. a video) may comprises a missing digital evidentiary item required to prosecute the offense 130-4 (e.g. which requires a report and a video as per the required items 131-4). Furthermore, while as depicted the jurisdictional digital evidentiary item 111-2 is stored at the database 110-1, in other examples the jurisdictional digital evidentiary item 111-2 may not yet be stored at the database 110-1 but rather may be stored at the digital evidence collection device 115-1 that acquired the jurisdictional digital evidentiary item 111-2.

While as depicted the database 117 stores one incident type 129, with associated offenses 130 and required items 131 (and/or the mapping 133), the database 117 may store any suitable number of incident types with associated offenses and required items (and/or associated digital offenses-to-evidentiary-items mappings).

Furthermore, the incident type 129, and the associated offenses 130 and required items 131, (and/or the mapping 133) and/or any other incident types offenses, required items and/or digital offenses-to-evidentiary-items mapping may be populated at the database 117 by an administrator of the system 100, and the like, based on jurisdictional rules for prosecuting offenses and/or causes of action (e.g. list of items required for prosecuting an offense and/or starting a lawsuit, and the like), and the like.

In general, the device 101 may use the incident type 129, and the mapping 133 (and the like) to determine a missing digital evidentiary item for prosecuting an offense, identify a jurisdictional agency most likely to have access to the missing digital evidentiary item, and electronically request the missing digital evidentiary item from the jurisdictional agency, as described below. Such functionality may be implemented using machine learning algorithms, as described in more detail below.

The device 101 may have associated functionality for providing indications of jurisdictional digital evidentiary items including, but not limited to rendering at the display screen 103, for an incident, indications of jurisdictional digital evidentiary items associated with the incident at a timeline in a dashboard.

Figure 2:
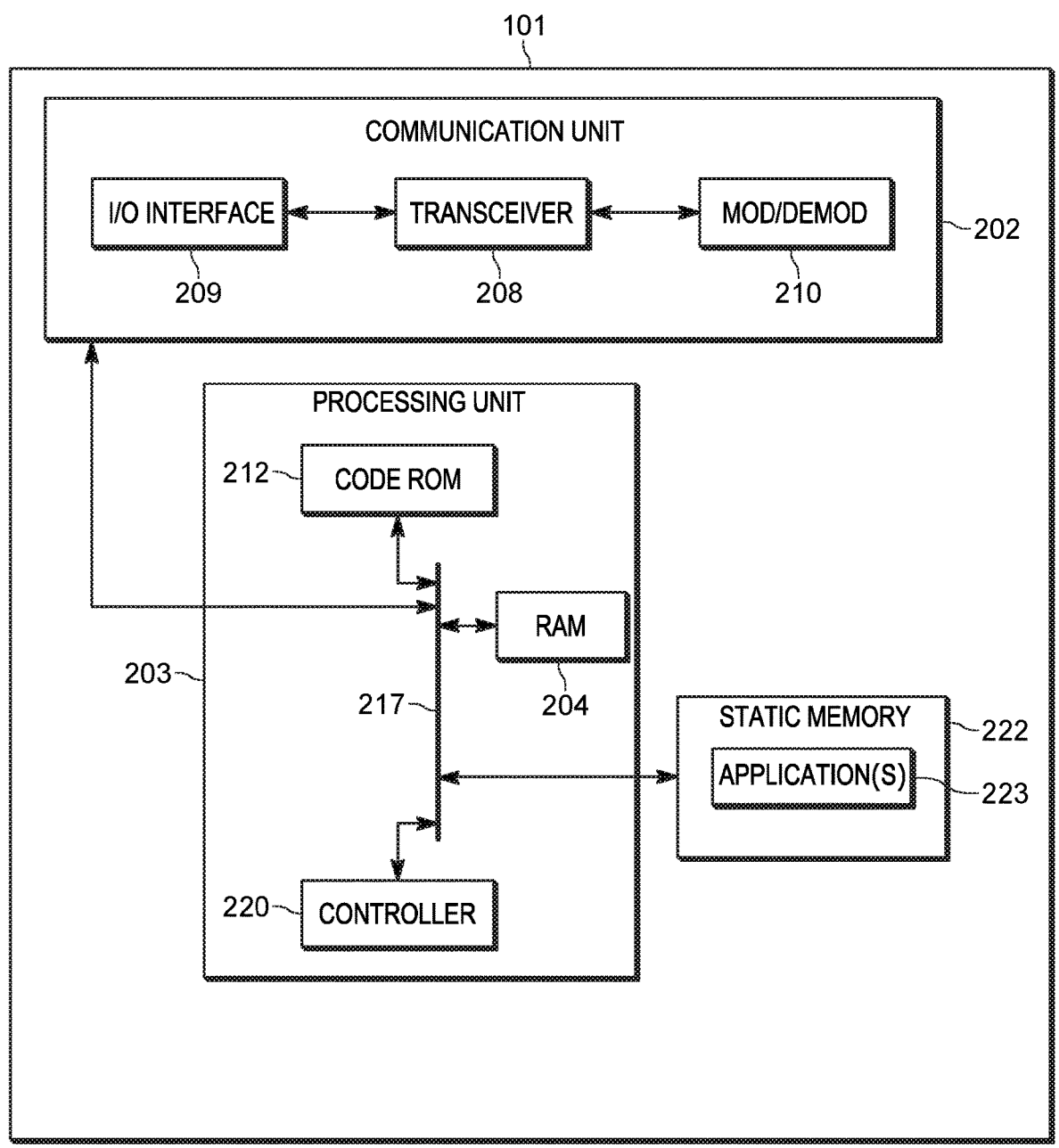
FIG. 2 is a device diagram showing a device structure of computing device for electronically requesting and storing missing digital evidentiary items, in accordance with some examples.

Attention is next directed to FIG. 2 which depicts a schematic block diagram of an example of the device 101. In general, the device 101 may comprise one or more servers and/or one or more cloud computing devices, and the like, configured to communicate with the display screen 103, the at least one input device 106, the databases 107, 117 and the jurisdictional agency computing devices 109. However, the device 101 may comprise a computing device such as a personal computer and/or a laptop computer, and the like. In some examples, the device 101 may be combined with the display screen 103 and/or the databases 107, 117; hence, in some examples, the dashboard device 101, the display screen 103 and the databases 107, 117 may be combined in a single device.

As depicted, the device 101 comprises: a communication unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, and a static memory 222 storing at least one application 223. Hereafter, the at least one application 223 will be interchangeably referred to as the application 223.

While not depicted, the device 101 may include one or more of an input device and a display screen and the like, a microphone (e.g. to receive voice commands) so that a user, such as the reviewer 105, may interact with the device 101. However, a user of the device 101, such as the reviewer 105, may interact with the device 101 via the display screen 103 and the at least one input device 106.

As shown in FIG. 2, the device 101 includes the communication unit 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209 that are configurable to communicate with the display screen 103, the at least one input device 106, the databases 107, 117 and the jurisdictional agency computing devices 109. For example, the communication unit 202 may include one or more transceivers 208 and/or wireless transceivers for communicating with the display screen 103, the at least one input device 106, the databases 107, 117 and the jurisdictional agency computing devices 109. Hence, the one or more transceivers 208 may be adapted for communication with one or more communication networks used to communicate with the display screen 103, the at least one input device 106, the databases 107, 117 and the jurisdictional agency computing devices 109. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g. a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components.

The controller 220 may include one or more logic circuits, one or more processors, one or more microprocessors, and/or the controller 220 may include one or more ASIC (application-specific integrated circuits) and one or more FPGA (field-programmable gate arrays), and/or another electronic device. In some examples, the controller 220 and/or the device 101 is not a generic controller and/or a generic device, but a device specifically configured to implement functionality for electronically requesting and storing missing digital evidentiary items. For example, in some examples, the device 101 and/or the controller 220 specifically comprises a computer executable engine configured to implement functionality for electronically requesting and storing missing digital evidentiary items.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the device 101 as described herein are maintained, persistently, at the memory 222 and used by the controller 220 which makes appropriate utilization of volatile storage during the execution of such programming instructions.

Figure 3:
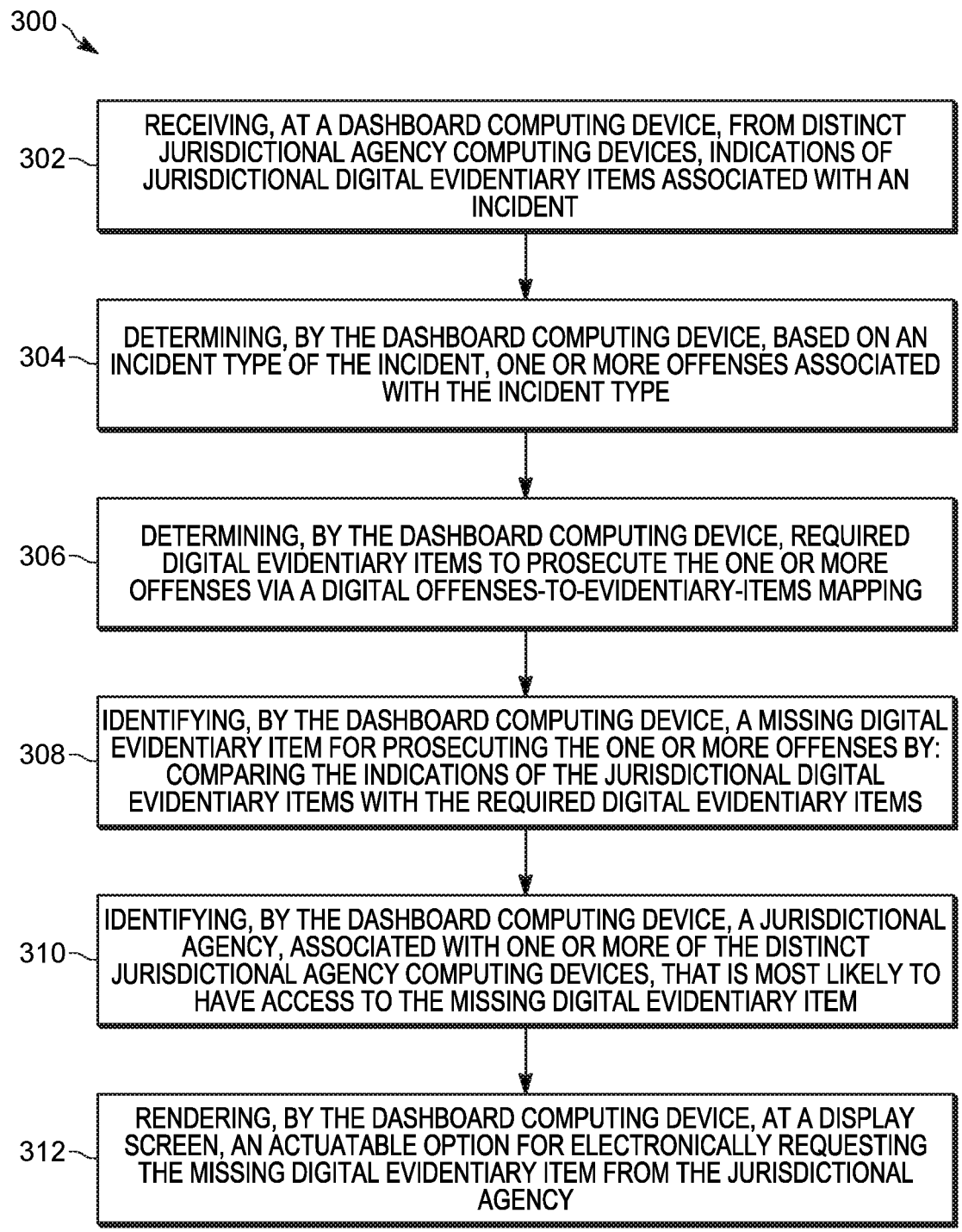
FIG. 3 is a flowchart of a method for electronically requesting and storing missing digital evidentiary items, in accordance with some examples.

In particular, the memory 222 stores instructions corresponding to the at least one application 223 that, when executed by the controller 220, enables the controller 220 to implement functionality described herein including, but not limited to, some or all of the blocks of the method set forth in FIG. 3.

In illustrated examples, when the controller 220 executes the one or more applications 223, the controller 220 is enabled to: receive, from distinct jurisdictional agency computing devices, indications of jurisdictional digital evidentiary items associated with an incident; determine, based on an incident type of the incident, one or more offenses associated with the incident type; determine required digital evidentiary items to prosecute the one or more offenses via a digital offenses-to-evidentiary-items mapping; identify a missing digital evidentiary item for prosecuting the one or more offenses by: comparing the indications of the jurisdictional digital evidentiary items with the required digital evidentiary items; identify a jurisdictional agency, associated with one or more of the distinct jurisdictional agency computing devices, that is most likely to have access to the missing digital evidentiary item; and render, at a display screen, an actuatable option for electronically requesting the missing digital evidentiary item from the jurisdictional agency.

The application 223 may include numerical algorithms configured for one or more of: identifying missing digital evidentiary item; and determining an offense associated with incident types.

Alternatively, and/or in addition to numerical algorithms, and/or programmed algorithms, predetermined algorithms, and/or static algorithms, the application 223 may include machine learning models and/or algorithms, and the like, which have been trained to one or more of: identify missing digital evidentiary item; and determine an offense associated with incident types. Furthermore, in these examples, the application 223 may initially be operated by the controller 220 in a training mode to train the machine learning models and/or algorithms of the application 223 to perform the above described functionality and/or generate classifiers therefor.

For example, when the controller 220 executes the one or more applications 223, the controller 220 may be further enabled to, in a training mode: receive, via an input device, a user-entered missing digital evidentiary item; and provide, to a machine learning training queue, the user-entered missing digital evidentiary item and jurisdictional digital evidentiary items (e.g. indications of which are already stored at the database 107) for training of a machine learning training model for one or more of: identifying missing digital evidentiary item; and determining an offense associated with incident types.

The one or more machine learning models and/or algorithms of the application 223 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public safety environments. Any suitable machine learning algorithm and/or deep learning algorithm and/or neural network is within the scope of present examples.

Attention is now directed to FIG. 3, which depicts a flowchart representative of a method 300 for electronically requesting and storing missing digital evidentiary items. The operations of the method 300 of FIG. 3 correspond to machine readable instructions that are executed by the device 101, and specifically the controller 220 of the device 101. In the illustrated example, the instructions represented by the blocks of FIG. 3 are stored at the memory 222 for example, as the application 223. The method 300 of FIG. 3 is one way in which the controller 220 and/or the device 101 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1A AND FIG. 1B, as well.

At a block 302, the controller 220 and/or the device 101 receives, from distinct jurisdictional agency computing devices 109, indications 121, 123 of jurisdictional digital evidentiary items 111, 113 associated with an incident. For example, as described above, jurisdictional agencies operating and/or managing the jurisdictional agency computing devices 109 may subscribe to a service offered by an entity operating the database 107 and agree to transmit indications of digital evidence stored at the database 110 to the centralized digital evidence database 107. As such, indications 121, 123 of jurisdictional digital evidentiary items 111, 113, associated with an incident, may be generated and transmitted by the jurisdictional agency computing devices 109, to the dashboard device 101 (which receives the indications 121, 123 at the block 302), when the items 111 are uploaded to the databases 110, and/or periodically, and the like. As has already been described, a respective indication for all the digital evidentiary items 111, 113 may not be received; such a situation may occur, for example, due to error and/or privacy issues (e.g. video may be designated as a digital evidentiary item that may require permission to access) and/or synchronization issues (e.g. there may be a delay between receiving some indications and other indications due, for example a delay between receiving digital evidentiary items 111, 113 and time for transmission of the indications), and the like. Indeed, in the example of FIG. 1A AND FIG. 1B, the database 107 does not store an indication of the item 111-2.

In some examples, the incident data 112, 114 is received with the indications 121, 123 and stored at the database 107, as depicted in FIG. 1A AND FIG. 1B.

At the block 302, the controller 220 and/or the device 101 may further determine whether the indications 121, 123 are associated with same or different incidents on the basis of, for example, respective dates, respective times, respective locations and/or respective incident types associated with the indications 121, 123. Hereafter, it is understood that the At a block 304, the controller 220 and/or the device 101 determines, based on an incident type 129 of the incident, one or more offenses 130 associated with the incident type.

For example, the controller 220 and/or the device 101 may determine the incident type 129 by one or more of: determining the incident type 129 from the indications 121, 123 of the jurisdictional digital evidentiary items 111, 113 associated with the incident; determining the incident type 129 from incident data 112, 114 received with the jurisdictional digital evidentiary items; and receiving the incident type 129 via an input device, such as the at least one input device 106.

When the controller 220 and/or the device 101 determines the incident type 129 by determining the incident type 129 from the indications 121, 123 of the jurisdictional digital evidentiary items 111, 113 associated with the incident, the controller 220 and/or the device 101 may use machine learning algorithms, and the like, to determine the incident type 129 and/or offenses 130 associated with an incident type. For example, a machine learning algorithm of the application 223 may be trained to determine an incident type from the indications 121, 123, and/or offenses 130 associated with an incident type based on types of items 111, 113 associated with the indications, and/or other data in the indications 121, 123. Otherwise, the controller 220 and/or the device 101 may extract the incident type 129 from the incident data 112, 114 and/or the controller 220 and/or the device 101 may receive the incident type 129 via the at least one input device 106 (e.g. via the reviewer 105 typing the incident type via a keyboard and/or selecting an incident type from a menu of incident types, and the like.

At a block 308, the controller 220 and/or the device 101 identifies a missing digital evidentiary item for prosecuting the one or more offenses by: comparing the indications 121, 123 of the jurisdictional digital evidentiary items 111, 113 with the required digital evidentiary items 131.

For example, to prosecute the offense 130-1, only an incident report may be required (e.g. as indicated by the required items 131-1); in particular, the indication 121 indicates that such an incident report is available and hence is not missing.

However, to prosecute the offense 130-4, an incident report and a video of the incident may be required, however a video of the incident is not indicated as being available by any of the indications 121, 123. As such, for the offense 130-4, a video of the incident may be identified as a missing digital evidentiary item for prosecuting the offense 130-4. Put another way, when a video of the incident is missing, an incident of the incident type 129 may be prosecuted only as a "petty theft", however, if a video of the incident may be found, an incident of the incident type 129 may be prosecuted only as an "armed robbery" (e.g. presuming such a video shows an offender robbing a person using a weapon). Hence, in a particular example, a video of an incident may be identified as a missing digital evidentiary item required to prosecute the offense 130-4.

It is further understood that, in some examples, the controller 220 and/or the device 101 may use machine learning algorithms, and the like, to identify a missing digital evidentiary item. For example, a machine learning algorithm of the application 223 may be trained to identify a missing digital evidentiary item based on types of items 111, 113 associated with the indications, and/or other data in the indications 121, 123.

At a block 310, the controller 220 and/or the device 101 identifies a jurisdictional agency, associated with one or more of the distinct jurisdictional agency computing devices 109, that is most likely to have access to the missing digital evidentiary item. Continuing with the example of a video of an incident having been identified as a missing digital evidentiary item, at the block 310 the controller 220 and/or the device 101 identifies a jurisdictional agency most likely to have access to a video of the incident.

It is further understood that, in some examples, the controller 220 and/or the device 101 may use machine learning algorithms, and the like, to identify a jurisdictional agency, associated with one or more of the distinct jurisdictional agency computing devices 109, that is most likely to have access to the missing digital evidentiary item. For example, a machine learning algorithm of the application 223 may be trained to identify a jurisdictional agency, associated with one or more of the distinct jurisdictional agency computing devices 109, that is most likely to have access to the missing digital evidentiary item based on types of items 111, 113 associated with the indications, and/or other data in the indications 121, 123 such as identifiers of the jurisdictional agencies and/or type of the jurisdictional agencies.

In a particular example, a city police department may be determined as being more likely to have access to video of an incident, as compared to state police officers, as city police officers (e.g. patrol officers) are more likely to be first at an incident scene (though such a situation may also depend on an address and/or location of the incident); as such, continuing with the example of a video of an incident having been identified as a missing digital evidentiary item, at the block 310 the controller 220 and/or the device 101 may identify the jurisdictional agency associated with the distinct jurisdictional agency computing devices 109-1 (e.g. a city police department), as being most likely to have access to video of an incident.

In other examples, however, such a determination may be at least partially performed numerically. For example, the controller 220 and/or the device 101 may be configured to determine relatedness scores for jurisdictional agencies, associated with the distinct jurisdictional agency computing devices 109, using the jurisdictional digital evidentiary items 111, 113 (and/or indications thereof) and a missing digital evidentiary item. For example, the application 223 may include a module, and the like, for determining relatedness scores based on prepopulated numerical rules, and the like. Continuing with the example described above, city police department be more likely to have access to video of an incident, as compared to state police officers, as city police officers (e.g. patrol officers) are more likely to be first at an incident scene, thought though such a situation may also depend on an address and/or location of the incident. Each of these factors may be associated with a numerical rule of application 223 that may be used to generated and increase and/or decrease and/or weight a relatedness score. For example, as a numerical rule may exist that indicates that a higher score is to be assigned to a city police department than a score assigned to a state police department when a missing digital evidentiary item is a video of an incident; another numerical rule may exist that increases or decreases the scores assigned to the city police department and the state police department based on a location of the incident, for example in relation to distance of the incident from a jurisdictional boundary of the city police department (e.g. incidents well within the jurisdictional boundary may result in a relatedness score of the city police department being increased and the relatedness score of the state police department being decreased; conversely, incidents outside the jurisdictional boundary may result in a relatedness score of the city police department being decreases and the relatedness score of the state police department being increased, though such increases or decreases may be based on distance of the incident from the jurisdictional boundary). Regardless, jurisdictional agency that is most likely to have access to the missing digital evidentiary item is generally understood to have a highest relatedness score. Furthermore, in some examples, machine learning algorithms may be used to generate relatedness scores.

At a block 312, the controller 220 and/or the device 101 renders at the display screen 103, an actuatable option for electronically requesting the missing digital evidentiary item from the jurisdictional agency.

For example, the controller 220 and/or the device 101 may renders at the display screen 103 a virtual button, and the like, at a dashboard provided at the display screen 103, that indicates that digital evidentiary item is missing and that may be requested from the jurisdictional agency upon actuation of the virtual button. However, such an actuatable option may be provided in any suitable format including, but not limited to, a selectable menu item (e.g. from a dropdown menu) and the like.

In particular, the method 300 may further comprise, the controller 220 and/or the device 101: receiving, via an input device (e.g. the at least one input device 106), an actuation of the actuatable option; in response to receiving the actuation, electronically requesting the missing digital evidentiary item from a computing device 109 associated with the jurisdictional agency (e.g. the jurisdictional agency computing device 109-1 to request a missing video); receiving, from the jurisdictional agency computing device 109 associated with the jurisdictional agency, a confirmation that the jurisdictional agency has access to the missing digital evidentiary item (e.g. a confirmation received from the jurisdictional agency computing device 109-1 that the jurisdictional agency has access to the item 111-2 (i.e. the missing video); and updating the database 107 (e.g. and/or any other suitable memory) storing the indications 121, 123 of the jurisdictional digital evidentiary items 111, 113 to include a respective indication of the missing digital evidentiary item.

Hence, for example, the controller 220 and/or the device 101 may request, from the jurisdictional agency computing device 109-1, the items 111-2 and receive, in response, and indication thereof which is stored at the database 107.

The method 300 may include yet further alternatives. For example, in some examples, the method 300 may further comprise, the controller 220 and/or the device 101: selecting from the one or more offenses 130 associated with the incident type 129, a first offense 130 to prosecute based on the indications of the jurisdictional digital evidentiary items 111, 113 associated with the incident; and after receiving the missing digital evidentiary item, selecting, from the one or more offenses 130 associated with the incident type 129, a second offense to prosecute based on the indications of the jurisdictional digital evidentiary items and the missing digital evidentiary item. Hence, for example, when only an incident report is available, the controller 220 and/or the device 101 may select "petty theft" (e.g. the offense 130-1) to prosecute; however, after the item 111-2 is received, the controller 220 and/or the device 101 may select "armed robbery" (e.g. the offense 130-4) to prosecute, again assuming that the video of the item 111-2 shows an armed offender robbing a person. In some of these examples, the controller 220 and/or the device 101 may retrieve the missing digital evidentiary item and perform analytics and/or video analytics thereupon to determine an offense 130 to prosecute; for example, when the video of the item 111-2 shows an armed robber, the controller 220 and/or the device 101 may select "armed robbery" (e.g. the offense 130-4) to prosecute, however when the video of the item 111-2 shows an unarmed robber, the controller 220 and/or the device 101 may select "robbery" (e.g. the offense 130-3) to prosecute (e.g. presuming the other required items 131-3 are not missing).

The method 300 may include yet other alternative related to rendering a dashboard at the display screen 103 and/or performing machine learning training, and the like.

In a particular example, the method 300 may further comprise, the controller 220 and/or the device 101: rendering, at the display screen 103, for an incident, indications 121, 123 of the jurisdictional digital evidentiary items 111, 113 associated with the incident, by one or more of: at a timeline; geographically; jurisdictionally; cause of action; and offense. For example, the controller 220 and/or the device 101: may render, at the display screen 103, the indications 121, 123 according to a time of acquisition of associated items 111, 113 (e.g. on a timeline) and/or by a location of acquisition of associated items 111, 113 (e.g. geographically on a map) and/or a combination thereof; in a particular example, a map showing location of acquisition of associated items 111, 113 may be animated by time such that an order of acquisition of associated items 111, 113 may appear on the map at associated locations as a function of time. In further examples, the controller 220 and/or the device 101: may render, at the display screen 103, the indications 121, 123 sorted by jurisdiction and/or sorted by a cause of action (e.g. list of required items 131 required for prosecuting an offense and/or starting a lawsuit, and the like)) and/or sorted by offense 130 (e.g. the offenses 130 may be listed with available associated required items 131 and/or with missing associated required items 131).

In a particular example, the method 300 may further comprise, the controller 220 and/or the device 101: rendering, at the display screen 103, for an incident, indications 121, 123 of the jurisdictional digital evidentiary items 111, 113 with identifications of jurisdictional agencies originating the jurisdictional digital evidentiary items 111, 113. Put another way, the controller 220 and/or the device 101 may render, at the display screen 103, the indications 121, 123 sorted by jurisdictional agency, for example on respective timelines for the jurisdictional agencies and/or in any other suitable format.

In another particular example, the method 300 may further comprise, the controller 220 and/or the device 101: rendering, at the display screen 103, for a plurality of incidents, which may including the incident of the block 302, respective indications of respective jurisdictional digital evidentiary items associated with the plurality of incidents at respective timelines; receiving, via an input device (e.g. the at least one input device 106), a selection of a given incident, of the plurality of incidents; and rendering, for the given incident that was selected, the respective indications of the respective jurisdictional digital evidentiary items on a respective timeline for the given incident, while excluding the respective indications of the respective jurisdictional digital evidentiary items for other incidents, of the plurality of incidents, that were not selected. Hence, for example, while only one incident has been heretofore discussed, the database 107 may store indications for a plurality of incidents and the controller 220 and/or the device 101 may render, at the display screen 103, for example at a dashboard, respective timelines for the plurality of incidents. In some examples, the incidents for which timelines are rendered at the display screen 103 may include incidents that have been assigned to the reviewer 105 to review (e.g. by a supervisor and the like). The reviewer 105 may operate the at least one input device 106 to select one of the incidents and/or one of the timelines for the incidents and the controller 220 and/or the device 101 may respond by removing other timelines from the display screen 103 to show details of the selected incident on a more detailed timeline, and the like.

In another particular example, the method 300 may further comprise, the controller 220 and/or the device 101, in a machine learning training mode: receiving, via an input device (e.g. the at least one input device 106), a user-entered missing digital evidentiary item; and providing, to a machine learning training queue, the user-entered missing digital evidentiary item and jurisdictional digital evidentiary items for training of a machine learning training model for one or more of: identifying missing digital evidentiary items; and determining an offense associated with incident types.

Put another way, the controller 220 and/or the device 101 may be operated, by the reviewer 105, and the like, in a machine learning training mode to provide the controller 220 and/or the device 101 with an example missing evidentiary item (e.g. from a given list of required items 131) and/or indication thereof; an associated offense 130, may also be provided by the reviewer 105, and the like. The controller 220 and/or the device 101 may then add the example missing evidentiary item (e.g. from a given list of required items 131) and/or the indication thereof, as well jurisdictional digital evidentiary items (and/or indications thereof) that are not missing (and/or associated offense 130) may be added to a training queue to provide a machine learning model with both inputs (e.g. jurisdictional digital evidentiary items (and/or indications thereof) that are not missing) as well as desired outputs (e.g. an identified missing evidentiary item and/or indication thereof, and/or an associated offense). As such respective classifiers may be generated accordingly. Similar techniques may be used to train a machine learning model to identify a incident type (e.g. by providing the controller 220 and/or the device 101 with an example incident type using available jurisdictional digital evidentiary items (and/or indications thereof), and the like (e.g. incident data, such as the incident data 112, 114).

Figure 4:
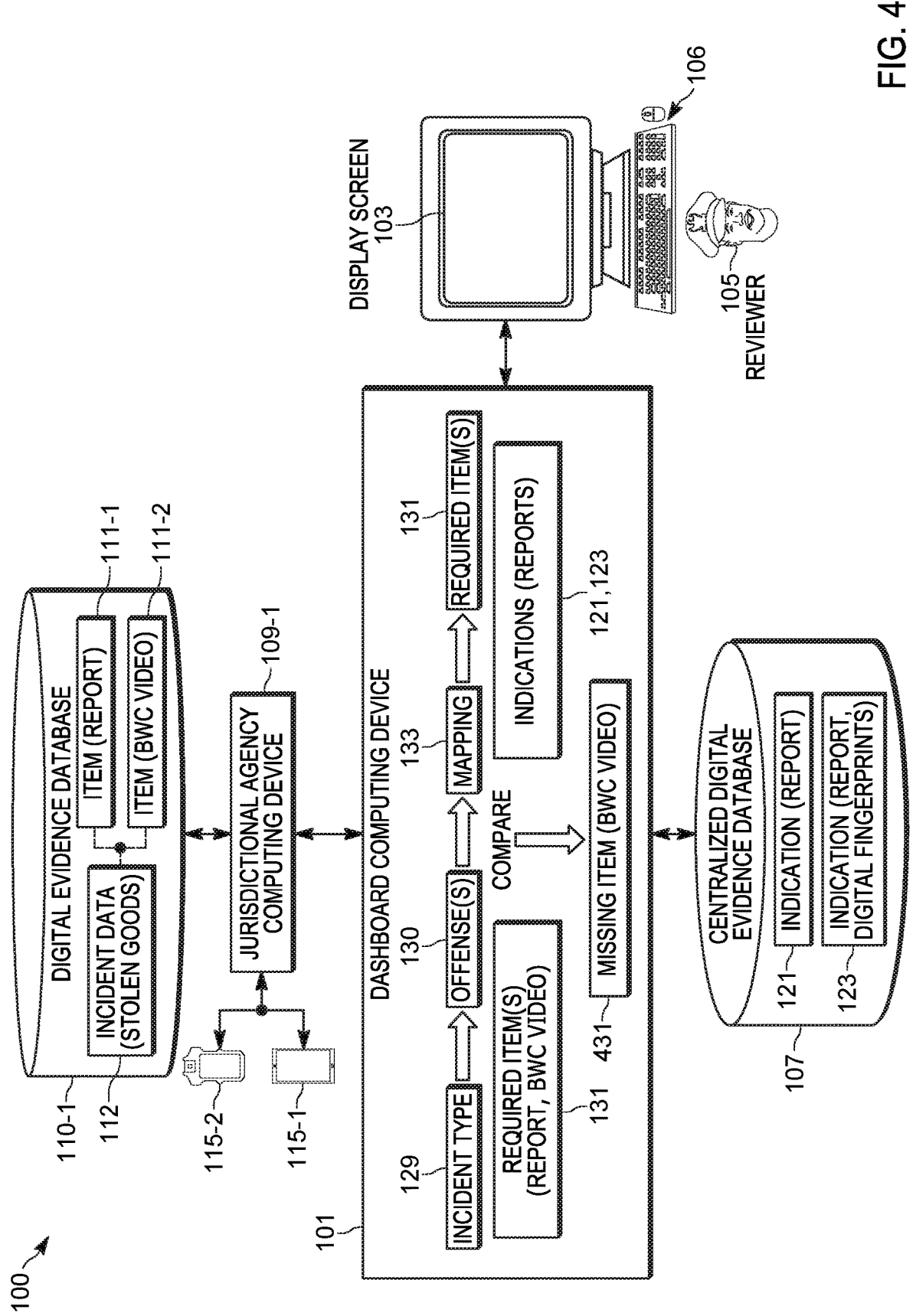
FIG. 4 depicts an example of a method for electronically requesting and storing missing digital evidentiary items implemented in the system of FIG. 1A and FIG. 1B, in accordance with some examples.
Figure 5:
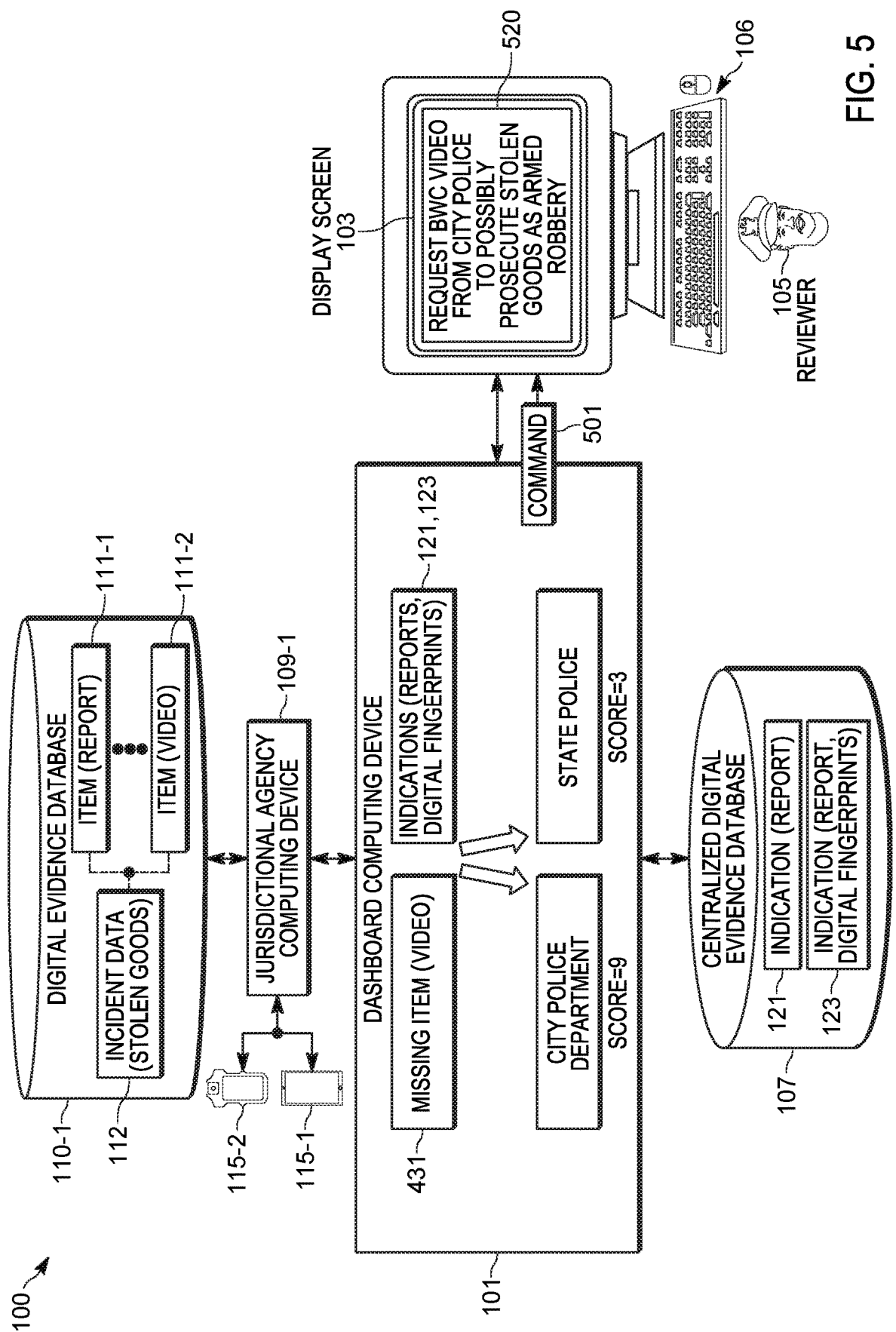
FIG. 5 continues to depict the example of a method for electronically requesting and storing missing digital evidentiary items implemented in the system of FIG. 1A and FIG. 1B, in accordance with some examples.
Figure 6:
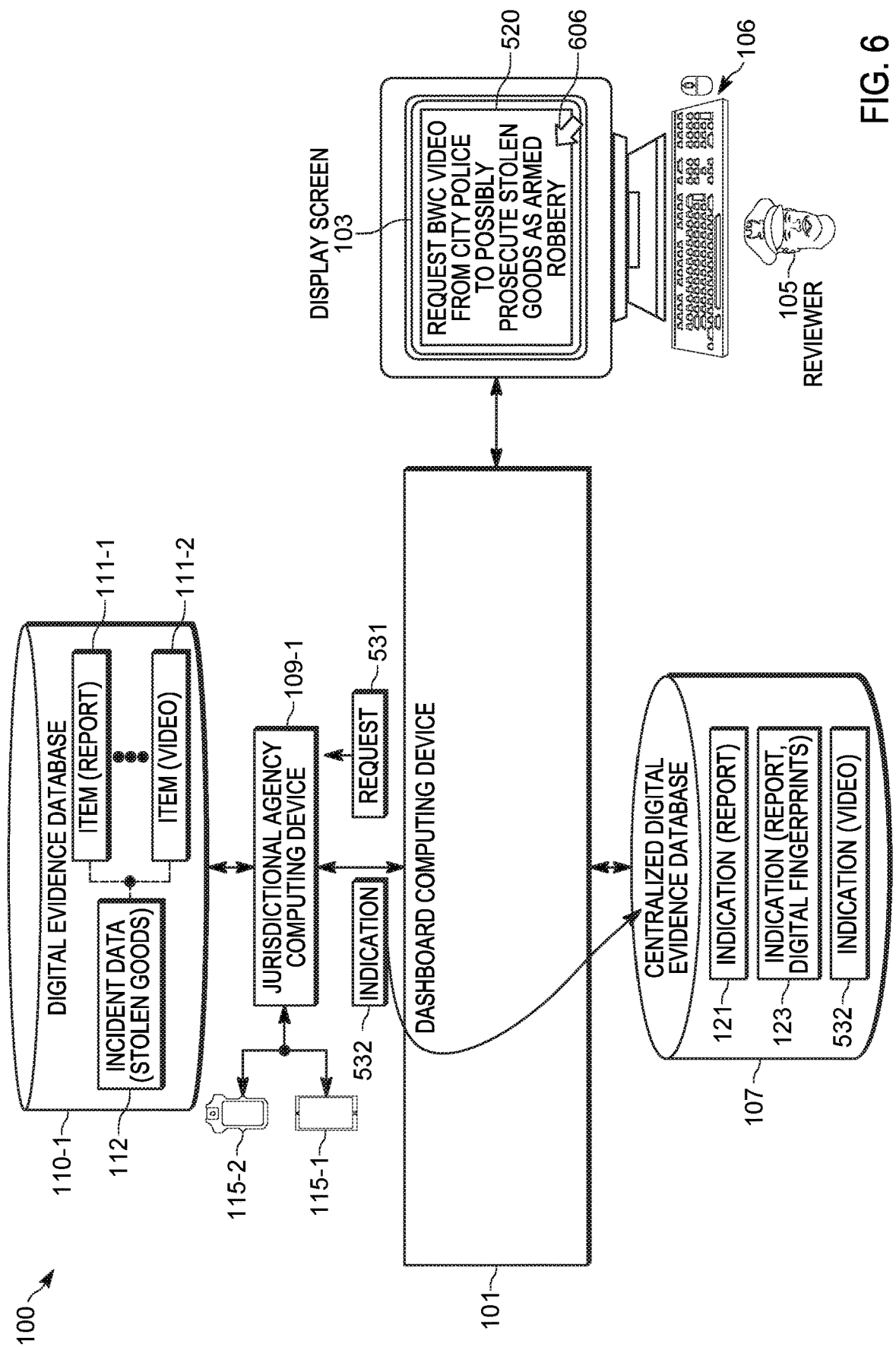
FIG. 6 continues to depict the example of a method for providing a recommendation to review a portion of a video based on importance scores, in accordance with some examples.

Examples of the method 300 are next described with respect to FIG. 4, FIG. 5 and FIG. 6 which depict a subset of the components of the system 100 of FIG. 1A AND FIG. 1B with like components having like numbers. While not all the components of the system 100 are depicted (e.g. for conciseness), they are nonetheless understood to be present.

Attention is next directed to FIG. 4 which depicts the indications 121, 123 having already been received (e.g. at the block 302 of the method 300) and stored at the database 107, as described above. In FIG. 4, the device 101 is further depicted, determining (e.g. at the block 304 of the method 300), based on a determined incident type 129 for an incident, one or more offenses 130 associated with the incident type 129. For example, as has already been described, the incident type 129 may be determined and the associated offenses 130 may be retrieved from the database 117.

In FIG. 4, the device 101 is further depicted, determining (e.g. at the block 306 of the method 300), based on the mapping 133 and the one or more offenses 130, required items 131 for prosecuting one or more of the offenses 130. For example, as has already been described, the mapping 133 may be used to retrieve the required items 131 from the database 117 using the one or more offenses 130.

In FIG. 4, the device 101 is further depicted, comparing (e.g. at the block 308 of the method 300) the required items 131 with the indications 121, 123 to identify missing digital evidentiary item 431; for example, as depicted, the missing digital evidentiary item 431 comprises a BWC video, for example to prosecute the offense 130-4.

Attention is next directed to FIG. 5 which depicts the device 101 identifying (e.g. at the block 310 of the method 300) a jurisdictional agency, associated with one or more of the distinct jurisdictional agency computing devices 109, that is most likely to have access to the missing digital evidentiary item 431. For example, an agency "City Police Department" is assigned a respective relevancy score of "9", and an agency "State Police" is assigned a respective relevancy score of "3", as described above. As the agency "City Police Department" has a higher relevancy score, the device 101 identifies the agency "City Police Department" as being most likely to have access to the missing digital evidentiary item 431.

As such the device 101 renders (e.g. at the block 312 of the method 300) at the display screen 103, an actuatable option 520 for electronically requesting the missing digital evidentiary item 431 from the agency "City Police Department". For example, as depicted, the device transmits a rendering command 501 to the display screen 103 that causes the display screen 103 to provide the actuatable option 520.

As depicted, the actuatable option 520 comprises a virtual button which, when actuated, causes an indication of the missing digital evidentiary item 431 to be requested from the jurisdictional agency computing device 109-1 associated with the agency "City Police Department". While the actuatable option 520 is provided with specific example text (e.g. "Request BWC Video From City Police To Possibly Prosecute Stolen Goods As Armed Robbery"), the actuatable option 520 may be provided in any suitable format.

For example, as depicted in FIG. 6, the reviewer 105 may operate a pointing device, and the like, of the at least one input device 106, to move a pointer 606 to the actuatable option 520 to actuate (e.g. "click on") the actuatable option 520. In response, the device 101 transmits a request 531 for the missing digital evidentiary item 431 to the jurisdictional agency computing device 109-1. The request 531 may identify an incident for which the missing digital evidentiary item 431 is being requested (e.g. via an incident number, and the like), as well a type of the missing digital evidentiary item 431 (e.g. BWC video). The jurisdictional agency computing device 109-1 responds by searching for and/or identifying the missing digital evidentiary item 431 (e.g. BWC video), such as the item 111-2 associated with the incident identified in the request 531 for example searching the database 110-1 for the missing digital evidentiary item 431, and generating and transmitting an indication 532 of the item 111-2 (e.g. identified as the missing digital evidentiary item 431) to the device 101. The device 101 receives the indication 532 and stores the indication 532 in the database. While details of the indication 532 are not provided, the indication 532 may be similar to the indications 121, 123, but indicating the missing digital evidentiary item 431 (e.g. BWC video).

Furthermore, in examples where the missing digital evidentiary item 431 is not already stored at the database 110-1, the jurisdictional agency computing device 109-1 may, in response to receiving the request 531, request the missing digital evidentiary item 431 from the mobile device 115-2.

In some examples, the missing digital evidentiary item 431 requested via the request 531 may not be available and/or missing (e.g. the jurisdictional agency computing device 109-1 may not be able to "find" BWC video associated with the incident). In these examples, the jurisdictional agency computing device 109-1 may respond to the request 531 with an indication of the missing digital evidentiary item 431 not being available.

Figure 7:
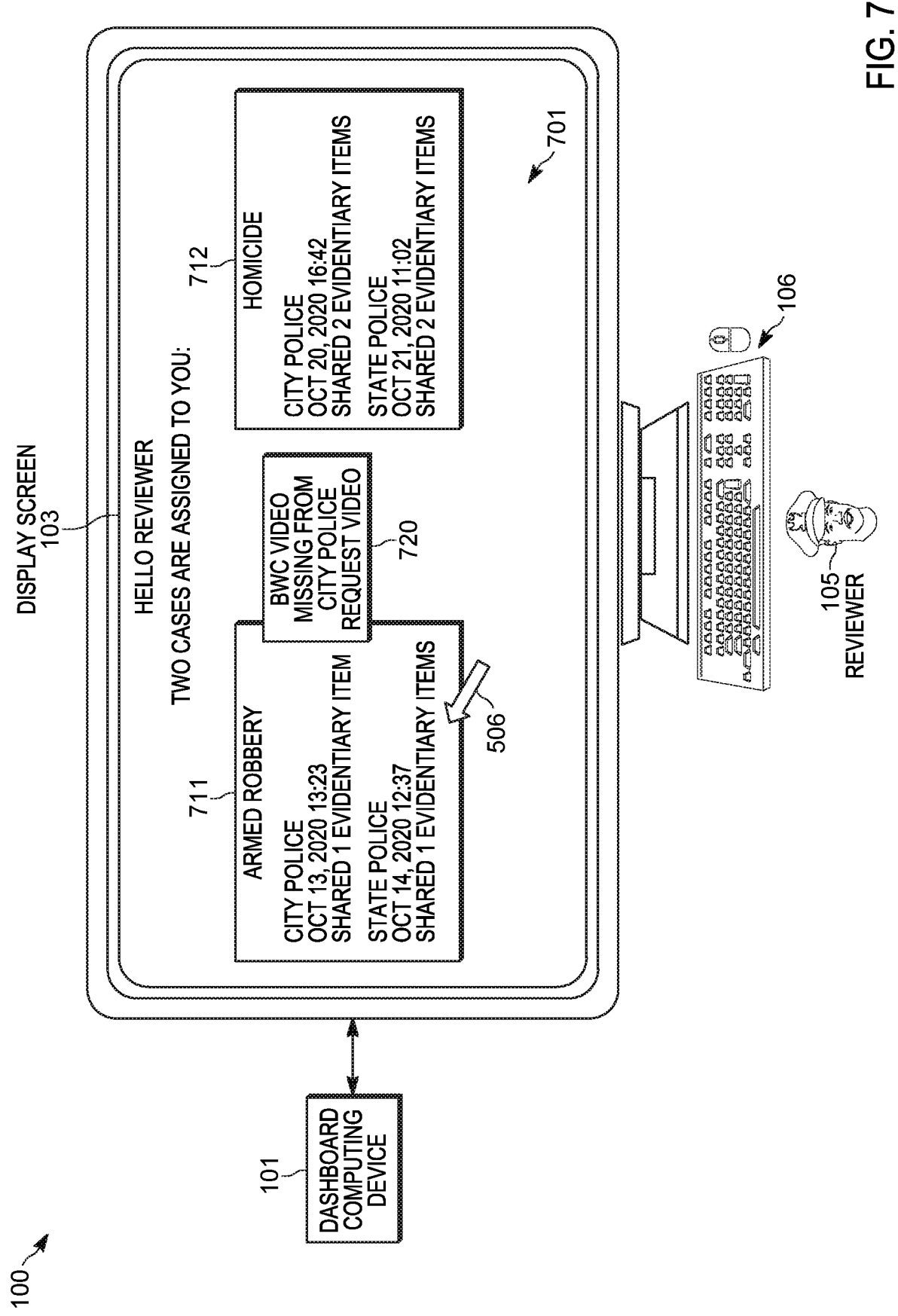
FIG. 7 depicts an example of a dashboard that may be provided at a display screen of the system of FIG. 1, in accordance with some examples.

Attention is next directed to FIG. 7 which depicts portion of the system 100 with like components having like numbers. In particular, FIG. 7 depicts an example of dashboard 701 that may be provided at the display screen 103. As depicted, the dashboard 701 comprises indications 711, 712 of two incidents: an armed robbery (e.g. the incident associated with the items 111, 113) and a homicide. While indications of only two incidents are provide, the dashboard 701 may include indications of any suitable number of a plurality of incidents.

As depicted, the indications 711, 712 comprise a respective timeline of digital evidentiary items received from different agencies for the associated incidents. In the given example, only general indications of digital evidentiary items being received are depicted (e.g. a date/time that digital evidentiary items were received from an agency and a number of digital evidentiary items received therefrom). The indication 711 further includes an actuatable option 720 for requesting a missing BWC video (e.g. a missing digital evidentiary item) from a jurisdictional agency that has been determined to be most likely to have access to the missing BWC video. The actuatable option 720 is generally similar to the actuatable option 520 and may be actuated via the pointer 506 to request BWC video from the agency "City Police" as described above.

Figure 8:
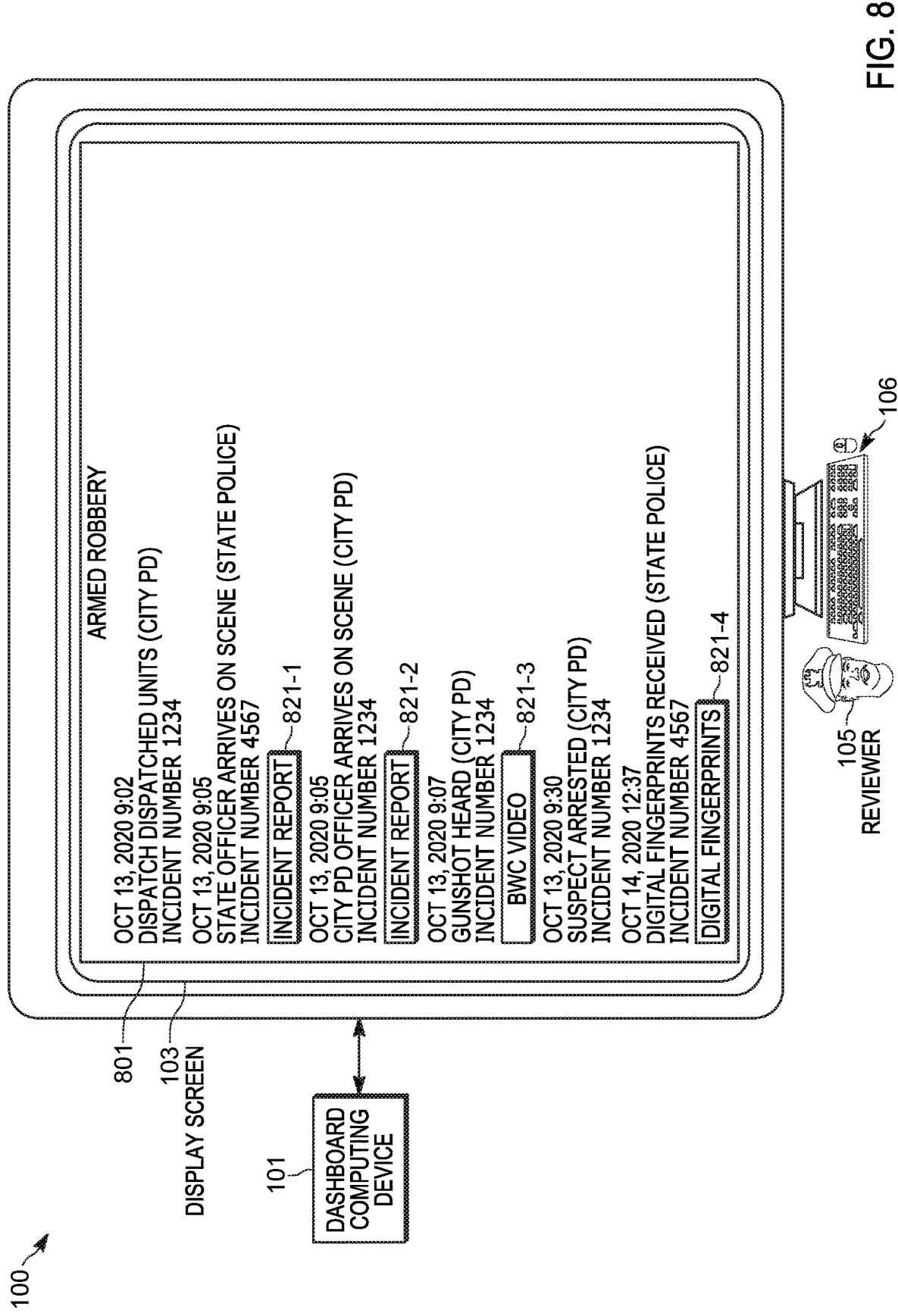
FIG. 8 depicts an example of a detailed timeline of an incident provided at the dashboard of FIG. 7, including respective indications of jurisdictional digital evidentiary items associated with the incident, in accordance with some examples.

As depicted, however, the pointer 506 may be used to select the indication 711 of the incident "Armed Robbery" to provide a more detailed timeline of the incident "Armed Robbery". For example, attention is next directed to FIG. 8 (which is substantially similar to FIG. 7) which assumes that the device 101 has received a selection of the indication 711 of the incident "Armed Robbery" via the pointer 506, and the device 101 has hence rendered a more detailed timeline 801 of the incident "Armed Robbery", including respective indications of the respective jurisdictional digital evidentiary items associated with the incident "Armed Robbery". Respective indications of the respective jurisdictional digital evidentiary items for the incident "Homicide" are excluded.

In particular, details of incident "Armed Robbery" have been extracted from the indications 121, 123 (and/or associated digital evidentiary items 111, 113, which may have been requested from the jurisdictional agency computing device 109), and provided on a timeline. The jurisdictional agency and a respective incident number is also provided.

As depicted, the timeline 801 further includes actuatable options 821-1, 821-2, 821-3, 821-4 for rendering (and/or requesting if not already requested) associated digital evidentiary items 111, 113. The actuatable options 821-1, 821-2, 821-3, 821-4 are further provided in association with an associated event on the timeline 801. For example, the actuatable option 821-1 is for rendering an incident report of the digital evidentiary items 113, the actuatable option 821-2 is for rendering an incident report of the digital evidentiary item 111-1, the actuatable option 821-3 is for rendering BWC video of the digital evidentiary item 111-2 (e.g. assuming the BWC video has been identified via the actuatable option 720), and the actuatable option 821-4 is for rendering digital fingerprints of the digital evidentiary items 113. While a particular format of the timeline 801 is depicted, the timeline 801 may have any suitable format and/or be rendered at least partially on a map showing locations at which associated digital evidentiary items were acquired, and the like; in some examples, such a map may have an animation by time option such that an order of acquisition of associated items 111, 113 may appear on the map at associated locations as a function of time (e.g. as an animation of the map "plays").

The timeline 801 may yet include other options, for example for sharing and/or playing items 111, 113 (e.g. such as BWC video), and the like.

As should be apparent from the foregoing Detailed Description, the operations and functions of the computing device are sufficiently complex as to require their implementation on a computer system, and cannot be performed, as a practical matter, in the human mind. Computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
   receiving, at a dashboard computing device, from distinct jurisdictional agency computing devices, indications of jurisdictional digital evidentiary items associated with an incident;
   determining, by the dashboard computing device, based on an incident type of the incident, one or more offenses associated with the incident type;
   determining, by the dashboard computing device, required digital evidentiary items to prosecute the one or more offenses via a digital offenses-to-evidentiary-items mapping;
   identifying, by the dashboard computing device, a missing digital evidentiary item for prosecuting the one or more offenses by: comparing the indications of the jurisdictional digital evidentiary items with the required digital evidentiary items;
   identifying, by the dashboard computing device, a jurisdictional agency, associated with one or more of the distinct jurisdictional agency computing devices, that is most likely to have access to the missing digital evidentiary item;
   rendering, by the dashboard computing device, at a display screen, an actuatable option for electronically requesting the missing digital evidentiary item from the jurisdictional agency;
   receiving, by the dashboard computing device, via an input device, an actuation of the actuatable option;
   in response to receiving the actuation, electronically requesting, by the dashboard computing device, the missing digital evidentiary item from a computing device associated with the jurisdictional agency;
   receiving, by the dashboard computing device, from the computing device associated with the jurisdictional agency, a confirmation that the jurisdictional agency has access to the missing digital evidentiary item; and
   updating, by the dashboard computing device, a memory storing the indications of the jurisdictional digital evidentiary items to include a respective indication of the missing digital evidentiary item.

2. The method of claim 1, further comprising determining the incident type by one or more of:
   determining the incident type from the indications of the jurisdictional digital evidentiary items associated with the incident;
   determining the incident type from incident data received with the jurisdictional digital evidentiary items; and
   receiving the incident type via the input device.

3. The method of claim 1, wherein identifying, by the dashboard computing device, the jurisdictional agency that is most likely to have access to the missing digital evidentiary item comprises:
   determining, by the dashboard computing device, relatedness scores for jurisdictional agencies, associated with the distinct jurisdictional agency computing devices, using the jurisdictional digital evidentiary items and the missing digital evidentiary item,
   wherein the jurisdictional agency that is most likely to have access to the missing digital evidentiary item has a highest relatedness score.

4. The method of claim 1, further comprising:
   selecting, by the dashboard computing device, from the one or more offenses associated with the incident type, a first offense to prosecute based on the indications of the jurisdictional digital evidentiary items associated with the incident; and
   after receiving the missing digital evidentiary item, selecting, by the dashboard computing device, from the one or more offenses associated with the incident type, a second offense to prosecute based on the indications of the jurisdictional digital evidentiary items and the missing digital evidentiary item.

5. The method of claim 1, wherein the jurisdictional digital evidentiary items comprise one or more of: digital videos; digital images; digital audio; digital incident reports; digital radio logs; digital fingerprints; and digital medical reports.

6. The method of claim 1, further comprising:
   rendering, by the dashboard computing device, at the display screen, for the incident, the indications of the jurisdictional digital evidentiary items associated with the incident, by one or more of:
   at a timeline;
   geographically;
   jurisdictionally;
   cause of action; and
   offense.

7. The method of claim 6, further comprising:
   rendering, by the dashboard computing device, at the display screen, for the incident, the indications of the jurisdictional digital evidentiary items with identifications of jurisdictional agencies originating the jurisdictional digital evidentiary items.

8. The method of claim 1, further comprising:
   rendering, by the dashboard computing device, at the display screen, for a plurality of incidents, including the incident, respective indications of respective jurisdictional digital evidentiary items associated with the plurality of incidents at respective timelines;
   receiving, by the dashboard computing device, via the input device, a selection of a given incident, of the plurality of incidents; and
   rendering, by the dashboard computing device, for the given incident that was selected, the respective indications of the respective jurisdictional digital evidentiary items on a respective timeline for the given incident, while excluding the respective indications of the respective jurisdictional digital evidentiary items for other incidents, of the plurality of incidents, that were not selected.

9. The method of claim 1, further comprising:
   receiving, by the dashboard computing device, via the input device, a user-entered missing digital evidentiary item; and providing, by the dashboard computing device, to a machine learning training queue, the user-entered missing digital evidentiary item and the jurisdictional digital evidentiary items for training of a machine learning training model for one or more of: identifying missing digital evidentiary items; and determining an offense associated with incident types.

10. A dashboard computing device comprising:

a communication unit; and a controller communicatively coupled with a display screen and the communication unit, the controller configured to:
receive, via the communication unit, from distinct jurisdictional agency computing devices, indications of jurisdictional digital evidentiary items associated with an incident;
determine, based on an incident type of the incident, one or more offenses associated with the incident type;
determine required digital evidentiary items to prosecute the one or more offenses via a digital offenses-to-evidentiary-items mapping;
identify a missing digital evidentiary item for prosecuting the one or more offenses by: comparing the indications of the jurisdictional digital evidentiary items with the required digital evidentiary items;
identify a jurisdictional agency, associated with one or more of the distinct jurisdictional agency computing devices, that is most likely to have access to the missing digital evidentiary item;
render, at the display screen, an actuatable option for electronically requesting the missing digital evidentiary item from the jurisdictional agency;
receive, via an input device, an actuation of the actuatable option;
in response to receiving the actuation, electronically request the missing digital evidentiary item from a computing device associated with the jurisdictional agency;
receive, from the computing device associated with the jurisdictional agency, a confirmation that the jurisdictional agency has access to the missing digital evidentiary item; and
update a memory storing the indications of the jurisdictional digital evidentiary items to include a respective indication of the missing digital evidentiary item.

11. The dashboard computing device of claim 10, wherein the controller is further configured to determine the incident type by one or more of:
determining the incident type from the indications of the jurisdictional digital evidentiary items associated with the incident;
determining the incident type from incident data received with the jurisdictional digital evidentiary items; and
receiving the incident type via the input device.

12. The dashboard computing device of claim 10 wherein the controller is further configured to identify the jurisdictional agency that is most likely to have access to the missing digital evidentiary item by:
determining, by the dashboard computing device, relatedness scores for jurisdictional agencies, associated with the distinct jurisdictional agency computing devices, using the jurisdictional digital evidentiary items and the missing digital evidentiary item,
wherein the jurisdictional agency that is most likely to have access to the missing digital evidentiary item has a highest relatedness score.

13. The dashboard computing device of claim 10, wherein the controller is further configured to:
select, from the one or more offenses associated with the incident type, a first offense to prosecute based on the indications of the jurisdictional digital evidentiary items associated with the incident; and
after receiving the missing digital evidentiary item, select, from the one or more offenses associated with the incident type, a second offense to prosecute based on the indications of the jurisdictional digital evidentiary items and the missing digital evidentiary item.

14. The dashboard computing device of claim 10, wherein the jurisdictional digital evidentiary items comprise one or more of: digital videos; digital images; digital audio; digital incident reports; digital radio logs; digital fingerprints; and digital medical reports.

15. The dashboard computing device of claim 10, wherein the controller is further configured to:
render, at the display screen, for the incident, the indications of the jurisdictional digital evidentiary items associated with the incident, by one or more of:
at a timeline;
geographically;
jurisdiction ally;
cause of action; and
offense.

16. The dashboard computing device of claim 15, wherein the controller is further configured to:
render, at the display screen, for the incident, the indications of the jurisdictional digital evidentiary items with identifications of jurisdictional agencies originating the jurisdictional digital evidentiary items.

17. The dashboard computing device of claim 10, wherein the controller is further configured to:
render, at the display screen, for a plurality of incidents, including the incident, respective indications of respective jurisdictional digital evidentiary items associated with the plurality of incidents at respective timelines;
receive, via the input device, a selection of a given incident, of the plurality of incidents; and
render, for the given incident that was selected, the respective indications of the respective jurisdictional digital evidentiary items on a respective timeline for the given incident, while excluding the respective indications of the respective jurisdictional digital evidentiary items for other incidents, of the plurality of incidents, that were not selected.

18. The dashboard computing device of claim 10, wherein the controller is further configured to:
receive, via the input device, a user-entered missing digital evidentiary item; and
provide, to a machine learning training queue, the user-entered missing digital evidentiary item and the jurisdictional digital evidentiary items for training of a machine learning training model for one or more of:
identifying missing digital evidentiary items; and determining an offense associated with incident types.

* * * * *